(12) United States Patent
Vu et al.

(10) Patent No.: US 11,410,082 B2
(45) Date of Patent: Aug. 9, 2022

(54) DATA LOSS MACHINE LEARNING MODEL UPDATE

(71) Applicant: International Business Machines Corporation, Armonk, NY (US)

(72) Inventors: Long Vu, Chappaqua, NY (US); Yuan-Chi Chang, Armonk, NY (US); Timothy R. Dinger, Croton-on-Hudson, NY (US); Venkata N. Pavuluri, New Rochelle, NY (US); Lingtao Cao, Hayward, CA (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 16/680,800

(22) Filed: Nov. 12, 2019

(65) Prior Publication Data

US 2021/0142211 A1    May 13, 2021

(51) Int. Cl.
| | | |
|---|---|---|
| *G06N 20/00* | (2019.01) | |
| *G06F 9/50* | (2006.01) | |
| *G06N 5/04* | (2006.01) | |
| *G06F 8/65* | (2018.01) | |

(52) U.S. Cl.
CPC .............. *G06N 20/00* (2019.01); *G06F 8/65* (2013.01); *G06F 9/5016* (2013.01); *G06N 5/04* (2013.01)

(58) Field of Classification Search
USPC .......................................................... 706/14
See application file for complete search history.

(56) References Cited

U.S. PATENT DOCUMENTS

| 8,214,308 B2 | 7/2012 | Chu |
|---|---|---|
| 8,620,840 B2 | 12/2013 | Newnham et al. |
| 2015/0142713 A1 | 5/2015 | Gopinathan et al. |

(Continued)

FOREIGN PATENT DOCUMENTS

| CA | 2990270 A1 * | 11/2018 | ............... G06F 9/46 |
|---|---|---|---|
| CN | 109271876 A | 1/2019 | |

OTHER PUBLICATIONS

Abbott, Dean, "Applied Predictive Analytics: Principles and Techniques for the Professional Data Analyst", Published by John Wiley and Sons, Inc. Apr. 2014, 453 pages.

(Continued)

*Primary Examiner* — Qing Chen
*Assistant Examiner* — Clint Thatcher
(74) *Attorney, Agent, or Firm* — Stephen J. Walder, Jr.; Jorge Maranto

(57) ABSTRACT

A mechanism is provided for implementing a model update mechanism to update new models in real time while avoiding data loss and system downtime. Responsive to receiving a request to update a scorer model currently being executed by an existing worker thread in the data processing system, the model update mechanism initializing a new worker thread. The model update mechanism loads an updated scorer model into the new worker thread and initializes a state transfer from the existing worker thread to the new worker thread. The model update mechanism executes the updated scorer model such that the updated scorer model scores the input data. The model update mechanism then outputs a prediction based on the updated scorer model processing of the input data.

20 Claims, 5 Drawing Sheets

(56) References Cited

U.S. PATENT DOCUMENTS

| | | | |
|---|---|---|---|
| 2015/0379429 A1* | 12/2015 | Lee | G09B 5/00 |
| | | | 706/11 |
| 2018/0300171 A1* | 10/2018 | Qiao | G06F 9/5088 |
| 2019/0095819 A1* | 3/2019 | Varadarajan | G06N 5/003 |
| 2019/0347578 A1* | 11/2019 | Bolding | H04L 63/1433 |
| 2019/0387007 A1* | 12/2019 | Muddu | H04L 63/06 |

OTHER PUBLICATIONS

Kobielus, James, "Practical Data Science and the Tricky Business of A/B Testing", Retrieved from https://www.dataversity.net/practical-data-science-tricky-business-ab-testing/, Jun. 2, 2014, 2 pages.

* cited by examiner

DATA LOSS MACHINE LEARNING MODEL UPDATE

BACKGROUND

The present application relates generally to an improved data processing apparatus and method and more specifically to mechanisms for updating a machine learning model without data loss and substantially no downtime.

In large-scale real-time machine learning applications, various types of computing models have become more highly desirable because they capture more specific behaviors and produce predictions that have higher accuracy. Examples of such desirable models include personalized machine learning computer models, group-based computer models, cluster-based computer models, and the like. The number of such models that must be managed by the system increases with an increased number of entities in the system, e.g., users, groups, etc. Moreover, as the size of the data used to train the model increases, the size of the model itself may become bigger. For example, a model size of 5 GB may occur using a random forest model while a deep learning model may have hundreds of millions parameters with the model size of hundreds of megabytes or more.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for updating new models in real time while avoiding data loss and system downtime. The illustrative embodiment initializes a new worker thread in response to receiving a request to update a scorer model currently being executed by an existing worker thread in the data processing system. The illustrative embodiment loads an updated scorer model into the new worker thread. The illustrative embodiment initializes a state transfer from the existing worker thread to the new worker thread. The illustrative embodiment executes the updated scorer model such that the updated scorer model scores the input data. The illustrative embodiment then outputs a prediction based on the updated scorer model processing of the input data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
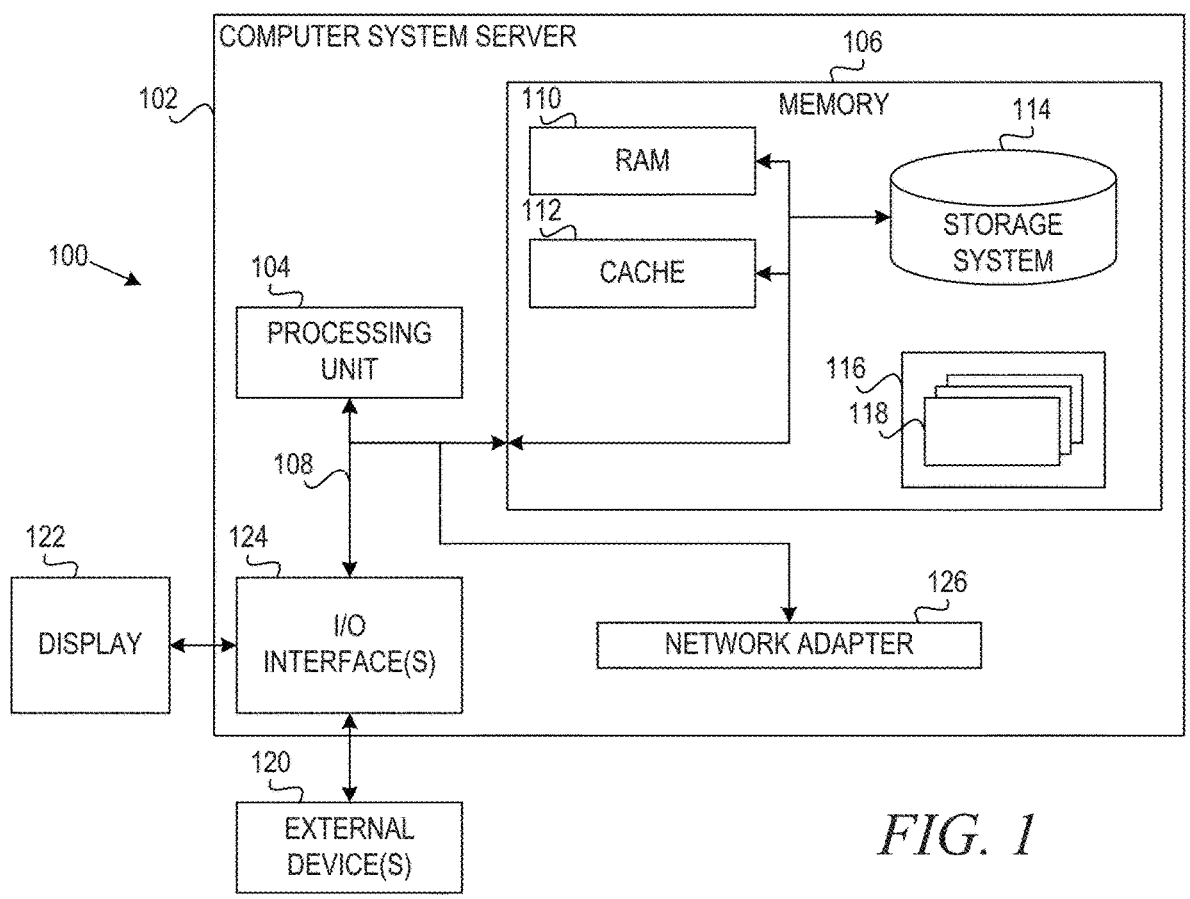
FIG. 1 depicts an exemplary cloud computing node in which aspects of the illustrative embodiments may be implemented.

As stated previously, in large-scale real-time machine learning applications, various types of computing models have become more highly desirable because they capture more specific behaviors and produce predictions that have higher accuracy. Examples of such desirable models include personalized machine learning computer models, group-based computer models, cluster-based computer models, and the like. The number of such models that must be managed by the system increases with an increased number of entities in the system, e.g., users, groups, etc. Moreover, as the size of the data used to train the model increases, the size of the model itself may become bigger. For example, a model size of 5 GB may occur using a random forest model while a deep learning model may have hundreds of millions parameters with the model size of hundreds of megabytes or more.

For example, consider a scenario in which a per-host model is needed to predict temporal workloads of all hosts in a network. This per-host model captures the host's specific configuration and the host's network traffic. Thus, in order to model all the hosts in a network of 300,000 machines, a corresponding number of models is required, i.e. 300,000 host models. As another example, in an online shopping application, online shoppers can be clustered into clusters based on their shopping patterns. An online shopping portal may have millions of users and thus, can have thousands of user clusters and hence, thousands of predictive models corresponding to the user clusters. In still another example, in the healthcare domain, the personalized predictive model is desirable since patients usually have highly personalized socio-economic characteristics. For example, 10,000 diabetic patients require 10,000 personalized models.

In order to provide maximum up-time, real-time model updates are required. However, due to the number and size of these models, real-time updates are not feasible with known mechanisms. Instead, known mechanisms require that the system be brought down so that the updates can be applied and then the system brought back online. In a real-time machine learning application, downtime also causes loss of data during the period when the system is not online.

Thus, the mechanisms of the illustrative embodiments address the challenges of how to update new models in real time while avoiding data loss and system downtime. The mechanisms further address the challenge of how to deal with large model sizes and large numbers of models, such as in the large-scale real-time machine learning application scenarios discussed above. The mechanisms provide an orchestrator that maintains an internal mapping data structure to dispatch incoming data to either a worker thread implementing the new model (updated model) or to a scorer of the existing model (executing in an existing thread) depending on whether or not an update to the model is being performed. That is, the orchestrator operates to redirect input data from a downstream scorer (existing thread) to a updated scorer (new worker thread) while the model implemented by the scorer is being updated. The updated scorer provides scoring capabilities while the update is being performed. The updated scorer implements the new (updated) model and thus, provides correct scoring capability while the new (updated) model is being loaded by the original scorer.

In addition, the mechanisms provide for segmenting a model into one or more segments which are stored in one or more model catalogs. Segments are transferred from the model catalog to the worker threads in an arbitrary order and the worker threads utilize a buffer of the arriving segments to incrementally load the model.

A model file may include multiple segments and metadata that contains information indicating the number of segments, metadata about the contents of the segments. For example, for a random forest model file, the metadata may indicate how many trees are in the model file and how the trees are encapsulated into segments, how the segments are combined to make the model, and application specific constraints such as which subsets of trees in a random forest model make a partially loaded model valid for prediction (scoring). Similarly, for a deep learning model, the metadata may indicate how many layers and parameters are in the model file, how layers are encoded into segments, how segments are combined to make the model, and which subsets of layers in a deep learning model make a partially loaded model valid for prediction (scoring). The metadata may be encapsulated in a separate segment or embedded in each of the segments.

The mechanisms separate a machine learning model into multiple segments which can be stored across multiple model libraries and provides mechanisms for merging these multiple segments into a single cohesive model. The ability to distribute the multiple segments across multiple model libraries helps to avoid a single point of failure and achieves a faster model loading process. The system becomes more resilient to network failure and file server (model library) failure.

Moreover, the model segment is much smaller than the model itself, and it may be very small even if the model binary gets bigger with increased training data volume. The updated scorer (new worker threads) of the illustrative embodiments performs scoring for models while loading an updated model segment by segment. If a large size model is loaded, e.g., a model of size 5 GB, the scorer may be blocked from scoring real-time incoming data, and loading a very large file over a network has a higher chance of failure. The segment by segment loading made possible by the mechanism of the illustrative embodiments helps to avoid such issues.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth herein.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116, having a set (at least one) of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 118 generally carry out the functions and/or methodologies of embodiments of the invention as described herein.

Computer system/server 102 may also communicate with one or more external devices 120 such as a keyboard, a pointing device, a display 122, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 124. Still yet, computer system/server 102 can communicate with one or more networks such as a local area network (LAN), a general wide area network (WAN), and/or a public network (e.g., the Internet) via network adapter 126. As depicted, network adapter 126 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

As shown in FIG. 1, one or more of the computing devices, e.g., computer system/server 102, may be specifically configured to implement a contextual tuning mechanism for contextual tuning of analytics to provide the most accurate or relevant analytic output. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer system/server 102, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates contextual tuning of analytics to provide the most accurate or relevant analytic output.

Figure 2:
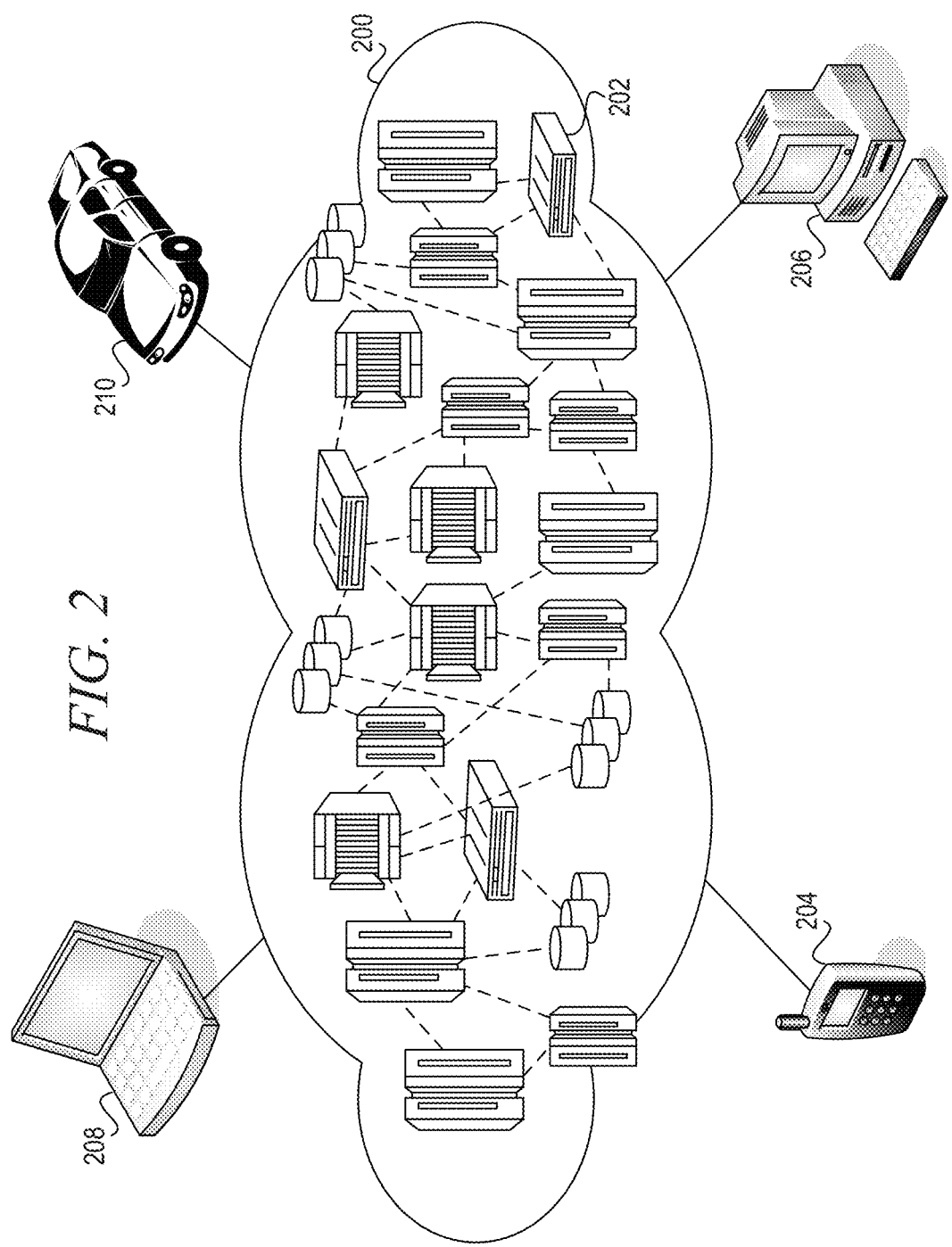
FIG. 2 depicts an exemplary cloud computing environment in which aspects of the illustrative embodiments may be implemented.

As noted above, the mechanisms of the illustrative embodiments utilize specifically configured computing devices, or data processing systems, to perform the operations for contextual tuning of analytics to provide the most accurate or relevant analytic output. These computing devices, or data processing systems, may comprise various hardware elements which are specifically configured, either through hardware configuration, software configuration, or a combination of hardware and software configuration, to implement one or more of the systems/subsystems described herein. FIG. 2 depicts an exemplary cloud computing environment 200 in accordance with an illustrative embodiment. As shown, cloud computing environment 200 comprises one or more cloud computing nodes 202, such as cloud computing node 100 of FIG. 1, with which local computing devices used by cloud consumers, such as, for example, personal digital assistant (PDA) or cellular telephone 204, desktop computer 206, laptop computer 208, and/or automobile computer system 210 may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 2 are intended to be illustrative only and that computing nodes 202 and cloud computing environment 200 can communicate with any type of computerized device over any type of network and/or network addressable connection (e.g., using a web browser). As such, computing devices 204-210 shown in FIG. 2 become specifically configured to implement the mechanisms of the illustrative embodiments and specifically configured to perform the operations and generate the outputs described hereafter with regard to contextual tuning of analytics to provide the most accurate or relevant analytic output.

Figure 3:
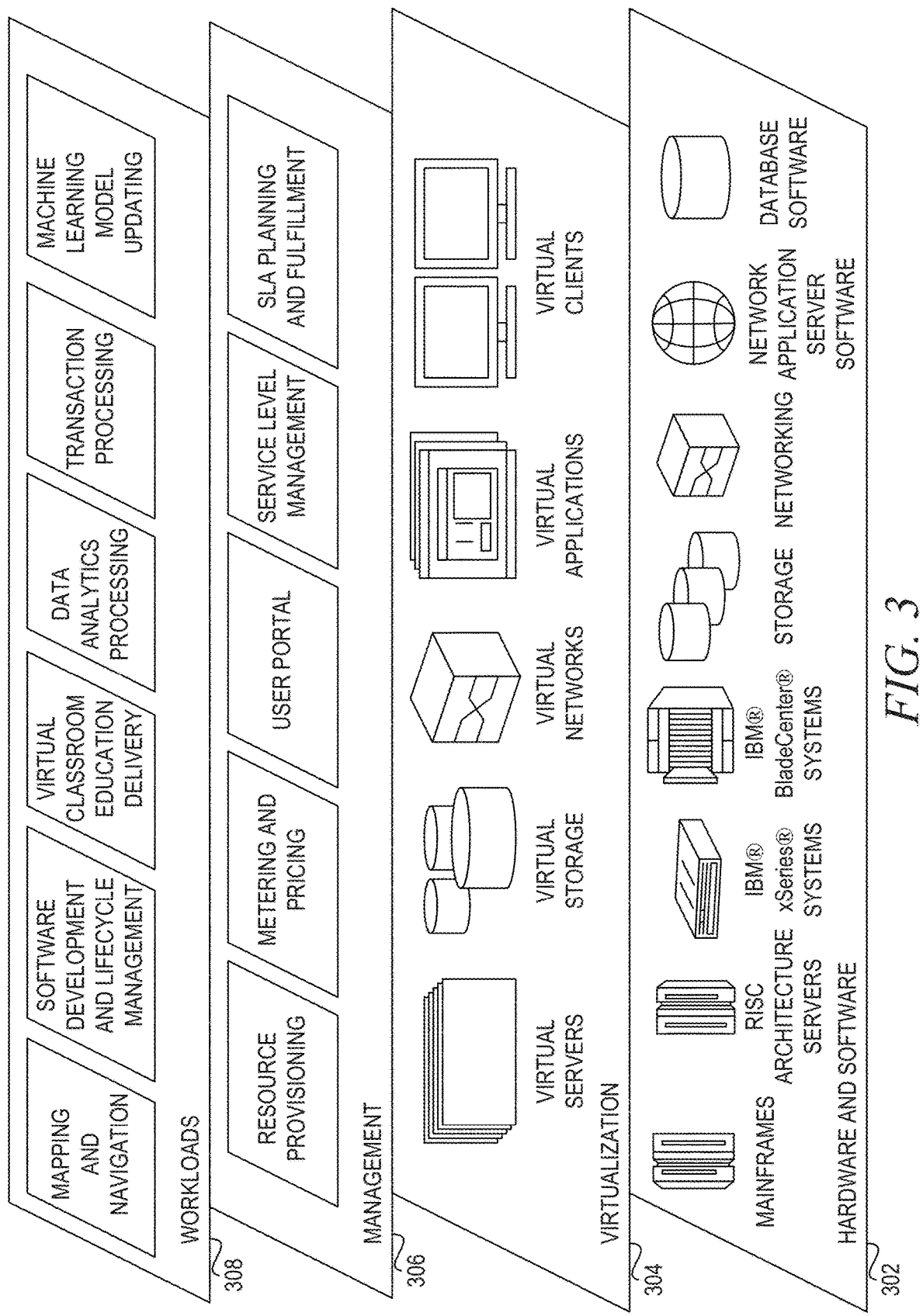
FIG. 3 depicts abstraction model layers of a cloud computing environment in which aspects of the illustrative embodiments may be implemented.

Referring now to FIG. 3, a set of functional abstraction layers provided by a cloud computing environment, such as cloud computing environment 200 of FIG. 2, is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; transaction processing; and machine learning model updating.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Thus, the illustrative embodiments may be utilized in many different types of data processing environments. In order to provide a context for the description of the specific elements and functionality of the illustrative embodiments, FIGS. 1-3 are provided as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system without departing from the spirit and scope of the present invention.

Figure 4:
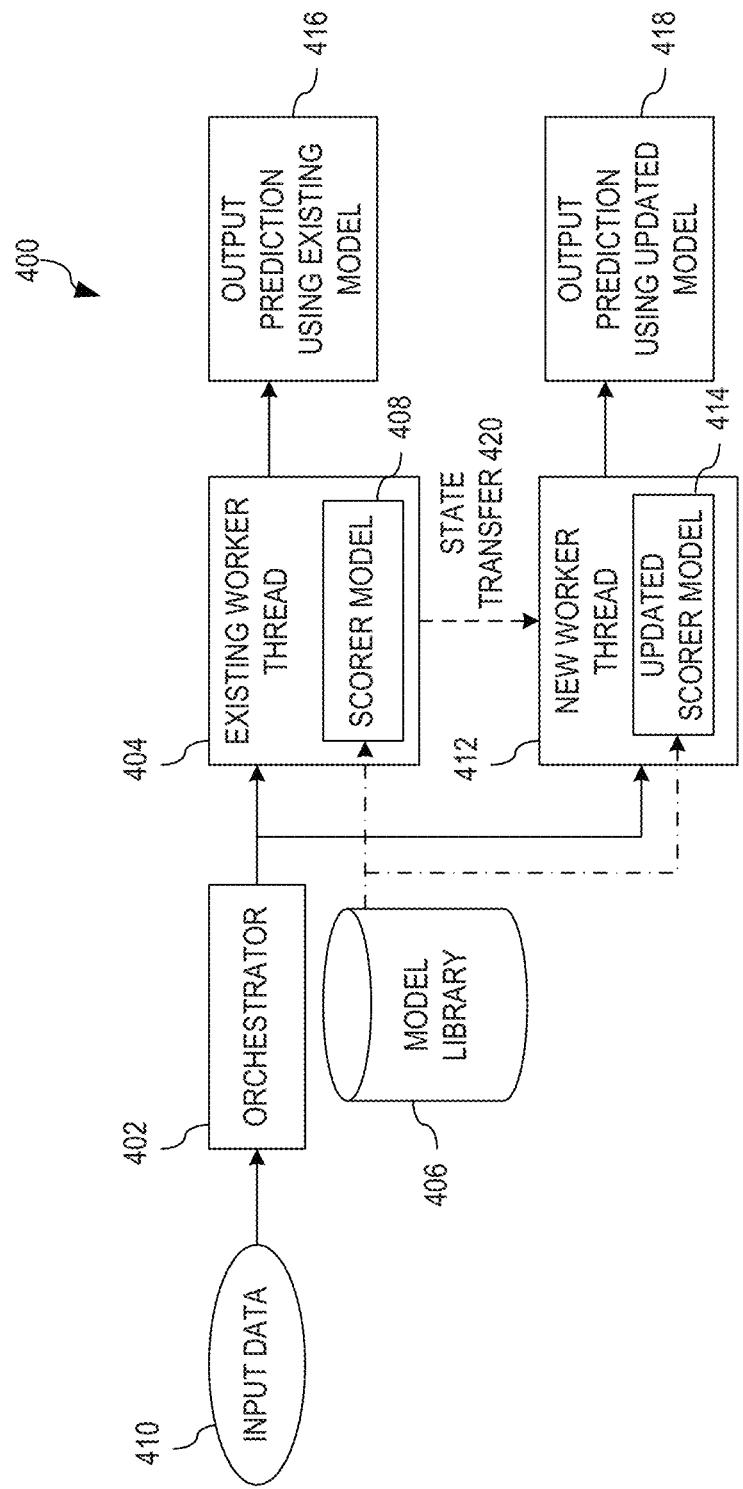
FIG. 4 depicts an exemplary function block diagram of a model update mechanism for updating new models in real time while avoiding data loss and system downtime in accordance with an illustrative embodiment.

FIG. 4 depicts an exemplary function block diagram of a model update mechanism for updating new models in real time while avoiding data loss and system downtime in accordance with an illustrative embodiment. Data processing system 400 comprises orchestrator 402, existing worker thread 404, and model library 406. Each scorer model 408 that is executed by existing worker thread 404 is comprised of multiple segments which are loaded individually from model library 406. That is, upon a request to execute scorer model 408, existing worker thread 404 loads the segments of the requested scorer model 408 from model library 406, merges the segment together to form the requested scorer model 408, and then executes the requested scorer model 408.

More specifically, each scorer model 408 may include multiple segments and metadata that contains information indicating the number of segments, metadata about the contents of the segments, e.g., for a random forest model file. For the exemplary random forest model file, the metadata may indicate how many trees are in the model file and how the trees are encapsulated into segments, how the segments are combined to make the scorer model 408, and application specific constraints such as which subsets of trees make a partially loaded scorer model valid for prediction (scoring). This metadata may be encapsulated in a separate segment or embedded in each of the segments. Again, the one or more model segments are stored in model library 406. Segments are transferred from model library 406 to existing worker thread 404 in an arbitrary order and existing worker thread 404 utilize a buffer of the arriving segments to incrementally load the requested scorer model 408, merge the segment together to form the requested scorer model 408, and execute the requested scorer model 408.

Scorer model 408, being executed by existing worker thread 404, receives input data from orchestrator 402, e.g., input data 410, input into orchestrator 402 which orchestrator 402 forwards to scorer model 408. Scorer model 408, being executed by existing worker thread 404, scores input data 410 and outputs a prediction 416 based on scorer model's 408 processing of input data 410.

Orchestrator 402 maintains a mapping between scorer models and worker threads/scorers and provides logic for redirecting input data when a scorer model update is required. Orchestrator 402 also has logic to restore an original mapping of input data once a model update finishes. Thus, in response to an update of a scorer model being performed, orchestrator 402 initializes new worker thread 412. New worker thread 412 loads one or more segments from model library 406 including one or more updated segments that will form an updated scorer model. As with the existing worker thread 404, the segments are transferred from model library 406 to new worker thread 412 in an arbitrary order and new worker thread 412 utilize a buffer of the arriving segments to incrementally load updated scorer model 414. New worker thread 412 then merges segments to form the updated scorer model and executes the updated scorer model to implement updated scorer model 414. New worker thread 412 notifies orchestrator 402 to direct input data 410 to updated scorer model 414. Orchestrator 402 sets up state transfer 420 from existing worker thread 404 to new worker thread 412. Updated scorer model 414 then scores input data 410 and outputs a prediction based on the processing of input data 410. The goal is to have input data 410 scored by updated scorer model 414 as soon as possible. Thus, new worker thread 412 loads updated scorer model 414 and updated scorer model 414 outputs a prediction 418 based on updated scorer model's 414 processing of input data 410. Thus, new worker thread 412 may start scoring using an incomplete updated scorer model 414 even though the complete updated scorer model 414 is not fully loaded. That is, new worker thread 412 may start scoring if the updated scorer model 414 has enough number of segments as specified in model meta-data. Therefore, while the partially loaded updated scorer model 414 is being scored, new segments are loaded to fulfill the updated scorer model 414 on the new worker thread 412. Accordingly, existing worker thread 404 utilizes scorer model 408 to output prediction 416 based on input data 410 only up until new worker thread 412 has fully loaded the updated scorer model 414. As soon as the updated scorer model is fully uploaded and executed, scorer model 408, being executed by existing worker thread 404, suspends scoring of input data 410.

It should again be appreciated that existing worker thread 404 may be responsible for hundreds or thousands of scoring models while new worker thread 412 is only responsible for updated scorer model 414. Thus, the implementation of the updated scorer model 414 in new worker thread 412 is simpler to implement and maintain than scorer model 408. Moreover, while updated scorer model 414 is being uploaded into new worker thread 412, existing worker thread 404 must keep executing other scorer models and scorer model 408 which increases the load on existing worker thread 404. Furthermore, if a scorer model is large, it may take a long time for existing worker thread 404 to load a new scorer model and thus, existing worker thread 404 will take a long time for input data 410 to be scored by a new model. Hence, using new worker thread 412 and updated scorer model 414 provides a quicker and easier method to implement solution to providing zero downtime and zero data loss during scorer model updates.

It should be appreciated that a scorer model may also be implemented such that it has two worker threads per scoring model, one worker thread that loads the scoring model file segment by segment while the other worker thread performs scoring of input data. However, this requires a more complex mechanism involving management of a large number of threads. Thus, new worker thread 412 and updated scorer model 414 may be implemented as a separate node connecting via a network.

Within existing worker thread 404, other scoring models and scoring model 408 keeps scoring input data while orchestrator 402 implements an update for scorer model 408, i.e. using new worker thread 412 and updated scorer model 414 to score input data 410 as the updated scoring model. Once new worker thread 412 successfully loads updated scorer model 414, new worker thread 412 notifies orchestrator 402 and orchestrator 402 restores the original mapping of input data 410 to updated scorer model 414 which now implements the updated scoring model. Thus, updated scorer model 414 is a very lightweight component and is only invoked when a new model update is needed.

It should be noted that data processing system 400 may have multiple worker threads and worker thread may be responsible for one or a plurality of scoring models. Moreover, the system may utilize multiple model libraries. A scoring model may consist of multiple model segments, each segment may be stored in one or multiple model libraries. Each worker thread may load one scoring model by pulling model segments from different model libraries in order to avoid a single point of failure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
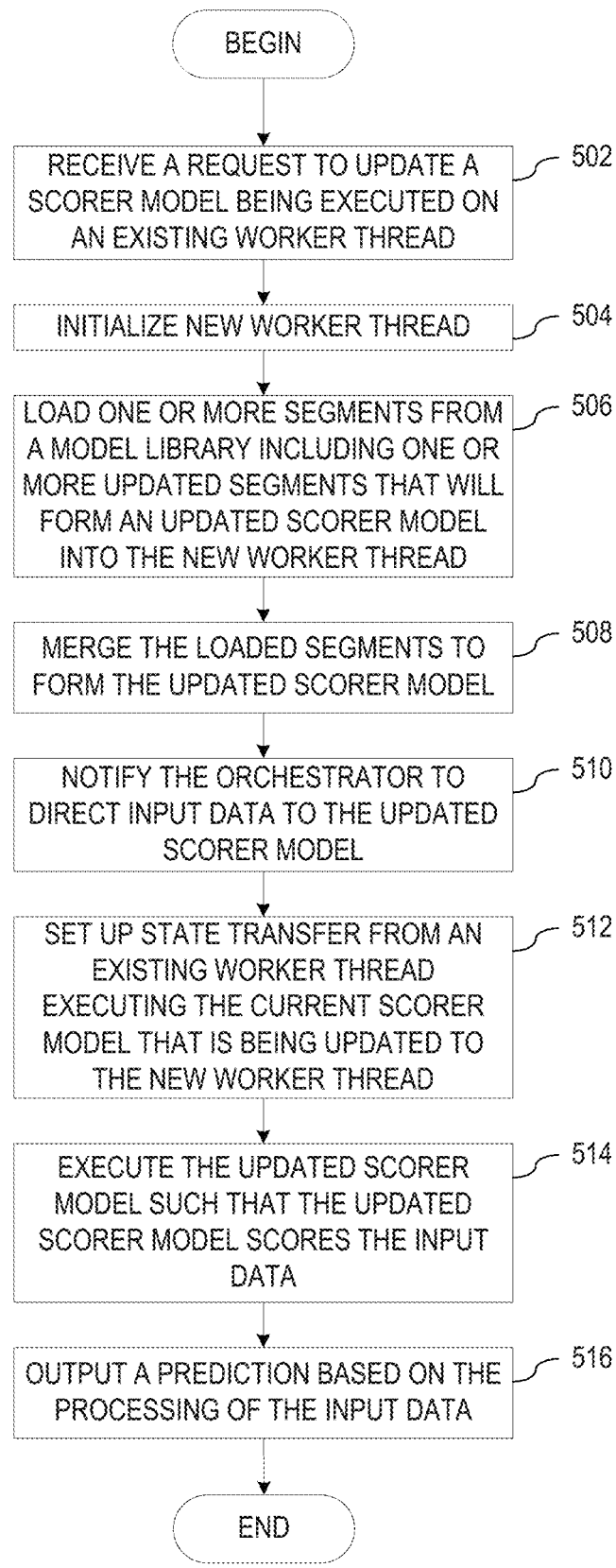
FIG. 5 depicts a flowchart of the operation performed by a model update mechanism for updating new models in real time while avoiding data loss and system downtime in accordance with an illustrative embodiment.

FIG. 5 depicts a flowchart of the operation performed by a model update mechanism for updating new models in real time while avoiding data loss and system downtime in accordance with an illustrative embodiment. As the operation begins, an orchestrator of the model update mechanism receives a request to update a scorer model being executed on an existing worker thread (step 502). In response to an update of a scorer model being requested, the orchestrator of the model update mechanism initializes new worker thread (step 504). The new worker thread of the model update mechanism then loads one or more segments from a model library including one or more updated segments that will form an updated scorer model into the new worker thread (step 506). The new worker thread merges the loaded segments to form the updated scorer model (step 508).

The new worker thread notifies the orchestrator to direct input data to the updated scorer model (step 510) at which time the orchestrator sets up state transfer from an existing worker thread executing the current scorer model that is being updated to the new worker thread (step 512). As soon as the new worker thread is able to execute the scorer model, the new worker thread executes the updated scorer model such that the updated scorer model scores the input data (step 514) and outputs a prediction based on the processing of the input data (step 516). The goal is to have the input data scored by the updated scorer model as soon as possible. Thus, the new worker thread may start scoring using an incomplete scorer model even though the complete updated scorer model is not fully loaded. That is, the new worker thread may start scoring if the updated scorer model has enough number of segments as specified in model metadata. Therefore, while the partially loaded updated scorer model is being scored, new segments are loaded to fulfill the updated scorer model on the new worker thread. Accordingly, the existing worker thread utilizes the scorer model to output a prediction based on the input data only up until the new worker thread has fully loaded the updated scorer model. Thus, as soon as the updated scorer model is fully uploaded and executed, the scorer model being executed by the existing worker thread suspends scoring of the input data. The process ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for updating new models in real time while avoiding data loss and system downtime. The illustrative embodiments provide an orchestrator that maintains an internal mapping data structure to dispatch incoming data to either a worker thread implementing the new model (updated model) or to a scorer of the existing model (executing in an existing thread) depending on whether or not an update to the model is being performed. That is, the orchestrator operates to redirect input data from a downstream scorer (existing thread) to an updated scorer (new worker thread) while the model implemented by the scorer is being updated. The updated scorer provides scoring capabilities while the update is being performed. The updated scorer implements the new (updated) model and thus, provides correct scoring capability while the new (updated) model is being loaded by the original scorer.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the at least one processor to implement a model update mechanism for updating new models in real time while avoiding data loss and system downtime, the method comprising:
   responsive to receiving a request to update a scorer model currently being executed by an existing worker thread in the data processing system, initializing a new worker thread;
   loading an updated scorer model into the new worker thread;
   initializing a state transfer from the existing worker thread to the new worker thread;
   executing the updated scorer model such that the updated scorer model scores the input data; and
   outputting a prediction based on the updated scorer model processing of the input data.

2. The method of claim 1, wherein loading the updated scorer model into the new worker thread comprises:
   retrieving one or more segments for the updated scorer model from a model library into the new worker thread; and
   merging the one or more segments to form the updated scorer model.

3. The method of claim 2, wherein the one or more segments are loaded in an arbitrary order and the new worker thread utilizes a buffer to incrementally load the updated scorer model.

4. The method of claim 1, wherein the existing worker thread continues to execute the scorer model until the updated scorer model is fully loaded into the new worker thread.

5. The method of claim 1, further comprising:
   responsive to the updated scorer model being fully loaded into the new worker thread, suspending scoring of the scorer model by the existing worker thread.

6. The method of claim 1, wherein the executing of the updated scorer model such that the updated scorer model scores the input data and the outputting of the prediction based on the updated scorer model processing of the input data is performed before the updated scorer model is fully loaded by the new worker thread.

7. The method of claim 1, wherein the new worker thread is two new worker threads, where a first new worker thread of the two new worker threads loads the updated scoring model segment by segment while a second new worker thread of the two new worker threads performs scoring of the input data before the updated scorer model is fully loaded by the first new worker thread of the two new worker threads.

8. A computer program product comprising a computer readable storage medium having a computer readable program stored therein, wherein the computer readable program, when executed on a data processing system, causes the data processing system to implement a model update mechanism for updating new models in real time while avoiding data loss and system downtime, and further causes the data processing system to:

responsive to receiving a request to update a scorer model currently being executed by an existing worker thread in the data processing system, initialize a new worker thread;

load an updated scorer model into the new worker thread;

initialize a state transfer from the existing worker thread to the new worker thread;

execute the updated scorer model such that the updated scorer model scores the input data; and output a prediction based on the updated scorer model processing of the input data.

9. The computer program product of claim 8, wherein the computer readable program to load the updated scorer model into the new worker thread further causes the data processing system to:

retrieve one or more segments for the updated scorer model from a model library into the new worker thread; and merge the one or more segments to form the updated scorer model.

10. The computer program product of claim 9, wherein the one or more segments are loaded in an arbitrary order and the new worker thread utilizes a buffer to incrementally load the updated scorer model.

11. The computer program product of claim 8, wherein the existing worker thread continues to execute the scorer model until the updated scorer model is fully loaded into the new worker thread.

12. The computer program product of claim 8, wherein the computer readable program further causes the data processing system to:

responsive to the updated scorer model being fully loaded into the new worker thread, suspend scoring of the scorer model by the existing worker thread.

13. The computer program product of claim 8, wherein the executing of the updated scorer model such that the updated scorer model scores the input data and the outputting of the prediction based on the updated scorer model processing of the input data is performed before the updated scorer model is fully loaded by the new worker thread.

14. The computer program product of claim 8, wherein the new worker thread is two new worker threads, where a first new worker thread of the two new worker threads loads the updated scoring model segment by segment while a second new worker thread of the two new worker threads performs scoring of the input data before the updated scorer model is fully loaded by the first new worker thread of the two new worker threads.

15. An apparatus comprising:

at least one processor; and at least one memory coupled to the at least one processor, wherein the at least one memory comprises instructions which, when executed by the at least one processor, cause the at least one processor to implement a model update mechanism for updating new models in real time while avoiding data loss and system downtime, and further cause the at least one processor to:

responsive to receiving a request to update a scorer model currently being executed by an existing worker thread in the data processing system, initialize a new worker thread;

load an updated scorer model into the new worker thread;

initialize a state transfer from the existing worker thread to the new worker thread;

execute the updated scorer model such that the updated scorer model scores the input data; and output a prediction based on the updated scorer model processing of the input data.

16. The apparatus of claim 15, wherein the instructions to load the updated scorer model into the new worker thread further cause the at least one processor to:

retrieve one or more segments for the updated scorer model from a model library into the new worker thread; and merge the one or more segments to form the updated scorer model.

17. The apparatus of claim 16, wherein the one or more segments are loaded in an arbitrary order and the new worker thread utilizes a buffer to incrementally load the updated scorer model.

18. The apparatus of claim 15, wherein the instructions further cause the at least one processor to:

responsive to the updated scorer model being fully loaded into the new worker thread, suspend scoring of the scorer model by the existing worker thread.

19. The apparatus of claim 15, wherein the executing of the updated scorer model such that the updated scorer model scores the input data and the outputting of the prediction based on the updated scorer model processing of the input data is performed before the updated scorer model is fully loaded by the new worker thread.

20. The apparatus of claim 15, wherein the new worker thread is two new worker threads, where a first new worker thread of the two new worker threads loads the updated scoring model segment by segment while a second new worker thread of the two new worker threads performs scoring of the input data before the updated scorer model is fully loaded by the first new worker thread of the two new worker threads.

* * * * *